United States Patent
Harkness et al.

(10) Patent No.: US 8,472,754 B1
(45) Date of Patent: Jun. 25, 2013

(54) IMAGE ARTIFACT PREVENTION

(75) Inventors: Roy N. Harkness, Sammamish, WA (US); Paul A. Larpenteur, Bothell, WA (US); Ajay Gopalakrishnan, Seattle, WA (US); Hubert Wong, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 329 days.

(21) Appl. No.: 12/944,161

(22) Filed: Nov. 11, 2010

(51) Int. Cl.
*G06K 9/32* (2006.01)
*G06K 15/02* (2006.01)

(52) U.S. Cl.
USPC .......................................... 382/298; 358/1.2

(58) Field of Classification Search
USPC ... 382/274–276, 298–300, 305, 312; 358/1.2, 358/3.27, 528, 533; 345/647, 660, 665, 670; 375/240.18, 254
See application file for complete search history.

(56) References Cited

U.S. PATENT DOCUMENTS

| | | | | |
|---|---|---|---|---|
| 6,600,838 B2 * | 7/2003 | Chui | ............................. | 382/249 |
| 6,647,061 B1 * | 11/2003 | Panusopone et al. | ..... | 375/240.12 |
| 7,324,706 B2 * | 1/2008 | Bassi | ............................. | 382/276 |
| 7,404,001 B2 * | 7/2008 | Campbell et al. | ............. | 709/231 |
| 7,627,191 B2 * | 12/2009 | Xu et al. | ........................ | 382/254 |
| 7,907,609 B2 * | 3/2011 | Kapoor et al. | ................ | 370/389 |

\* cited by examiner

*Primary Examiner* — Kanjibhai Patel

(74) *Attorney, Agent, or Firm* — Novak Druce Connelly Bove + Quigg LLP

(57) ABSTRACT

Systems and methods are provided for processing images (or other such instances of content) to detect which of the images exhibit artifacts when modified, such as by applying standard transformation algorithms to modify the images. Such techniques enable transformation algorithms to be applied to the detected images to minimize or prevent artifacts. In some embodiments, the headers of the detected images can be tagged with transformative instructions that indicate which transformation algorithms to apply. Responsive to a request from a web client to modify and render one of the detected images, embodiments obtain the requested image, read the transformative instructions in the header, apply the transformation algorithm specified in the header to modify the image so as to minimize or prevent artifacts, and render the modified image.

26 Claims, 6 Drawing Sheets

IMAGE ARTIFACT PREVENTION

BACKGROUND

As there are an increasing number of devices used to display content, there is a corresponding need to adjust that content to be displayed on those various devices. In some instances, web servers statically render images that have already been scaled for particular web pages. In these instances, the images are served to clients exactly as stored on the web servers. However, in other instances, web servers dynamically scale images when serving the images to clients. For example, in these instances, web servers may dynamically scale images at render time in response to particular requests from clients. These requests may be provided in the URL, an HTTP message, request headers, etc.

Client devices commonly request that web servers dynamically downscale images at render time. To do so, web servers commonly apply standard downscaling algorithms, which are designed to reduce the size of the image while persevering as much information as possible from the original image. These standard downscaling algorithms work well for most images. However, rescaling artifacts result from downscaling certain images. Such artifacts include moiré effects, contouring, skinning, and ringing. These artifacts cause the downscaled image to be of poorer quality than the original image. Special downscaling algorithms are available and may be applied to downscale these images without causing artifacts. However, special downscaling algorithms typically require more processing time than standard downscaling algorithms. This increased processing time results in longer page load times and added costs.

Accordingly, because standard downscaling algorithms work well for most images, it would be desirable to apply standard algorithms to most images and to only apply special downscaling algorithms as needed.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of numbers is for purposes of simplicity of explanation and understanding, and should not be viewed as a limitation on the various embodiments.

DETAILED DESCRIPTION

Figure 1:
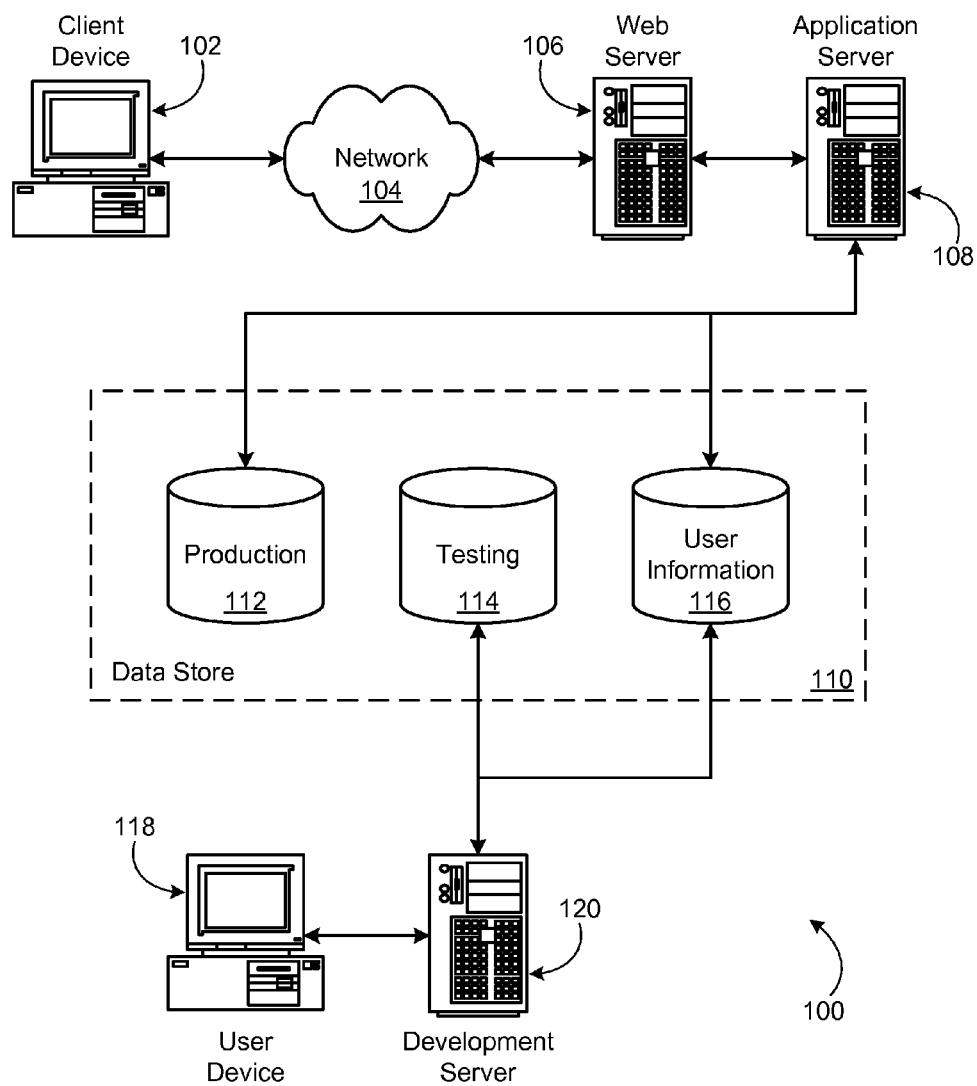
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiment being described.

Disclosed herein are example techniques, including systems and methods, for processing images (or other such instances of content) to detect which of the images exhibit artifacts when modified, such as by applying standard scaling algorithms to scale the images. Such techniques enable transformation algorithms, such as scaling algorithms, to be applied to the detected images to minimize or prevent artifacts. In some embodiments, the headers of the detected images can be tagged with transformative instructions, such as scaling instructions, that indicate which transformative algorithms, such as scaling algorithms, to apply. Responsive to an request from a web client to transform and render one of the detected images, embodiments obtain the requested image, read the transformative instructions in the header, apply the transformation algorithm specified in the header to transform the image so as to minimize or prevent artifacts, and render the transformed image.

According to an example, embodiments may process images as the images are uploaded to a web server, which is configured to scale and present the images pursuant to commands received from web client devices. According to this example, embodiments process the images to identify which of the images exhibit artifacts when scaled by a standard scaling algorithm. For example, to identify which images exhibit artifacts, embodiments identify differences between an image before and after it is scaled using a standard scaling algorithm. Also, for example, to identify which images exhibit artifacts, embodiments identify differences between an image after it has been scaled by a standard scaling algorithm and the image after it has been scaled by a special scaling algorithm (e.g., a moiré scaling algorithm). Images identified as being images that exhibit artifacts when scaled by standard scaling algorithms are tagged. According to an embodiment, the tags include scaling instructions, which are determined based on the type of artifact observed. For example, if the artifact is a moiré pattern, then the scaling instructions indicate that a moiré scaling algorithm should be used to scale the image.

Upon receiving a request from a client device to present one of the tagged images at a specified size, the web server is configured to read the tag and apply the specified scaling algorithm. Thus, the web server is able to scale the image at render time in a manner that minimizes or prevents image artifacts. Further, because the tag tells the web server which scaling algorithm to use, the web server does not have to allocate processing resources to determining which algorithm to apply, thereby saving processing time and cost.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers (PCs), cell phones, mobile phones, smart phones, third generation (3G) phones, touch-screen phones, handheld messaging devices, netbooks, computers incorporating touch-screens, tablet PCs, laptop computers, set-top boxes, personal data assistants (PDAs), electronic book readers, and the like. The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment. The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example. The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a build server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110. The data store 110 is operable, through logic associated therewith, to receive instructions from the application server 108 or build server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

It will be helpful to have reference to an example system configured to, among other things: process images to detect which of the images exhibit artifacts when transformed using standard transformation algorithms; determine which transformation algorithms minimize or prevent the artifacts; tag the headers of the identified images with transformative instructions that indicate which transformation algorithms minimize or prevent artifacts; and transform the identified images according to the transformative instructions, in accordance with at least one embodiment. For illustrative convenience, image scaling is referred to herein as an example of an image transformation. Accordingly, example transformative instructions referred to herein include scaling instructions and example transformation algorithms referred to herein include scaling algorithms. However, it should be appreciated that any type of transformative instruction or transformation algorithm may be applied to execute any type of image transformation. For example, the transformative instructions and transformation algorithms may relate to transforming images to improve the overall image quality, the quality of the text presented, the quality of faces presented, and the quality of the image texture without necessarily scaling the image. Further for example, moiré effect is often referred to herein as an example of an image artifact that occurs when images are transformed. However, it should be appreciated that any type of image artifact may occur and then be detected and corrected using an appropriate image transformation algorithm. For example, such example image artifacts include contouring, skinning, and ringing. Another example of an image artifact considered herein is characterized by a image losing a boarder, such as the boarder of a book cover, when the image is downscaled. According to some embodiments, the header of an image that exhibits such an artifact may be tagged with transformative instructions that specify application a transformative algorithm that regenerates the boarder in the downscaled image if the boarder is lost during downscaling.

Figure 2:
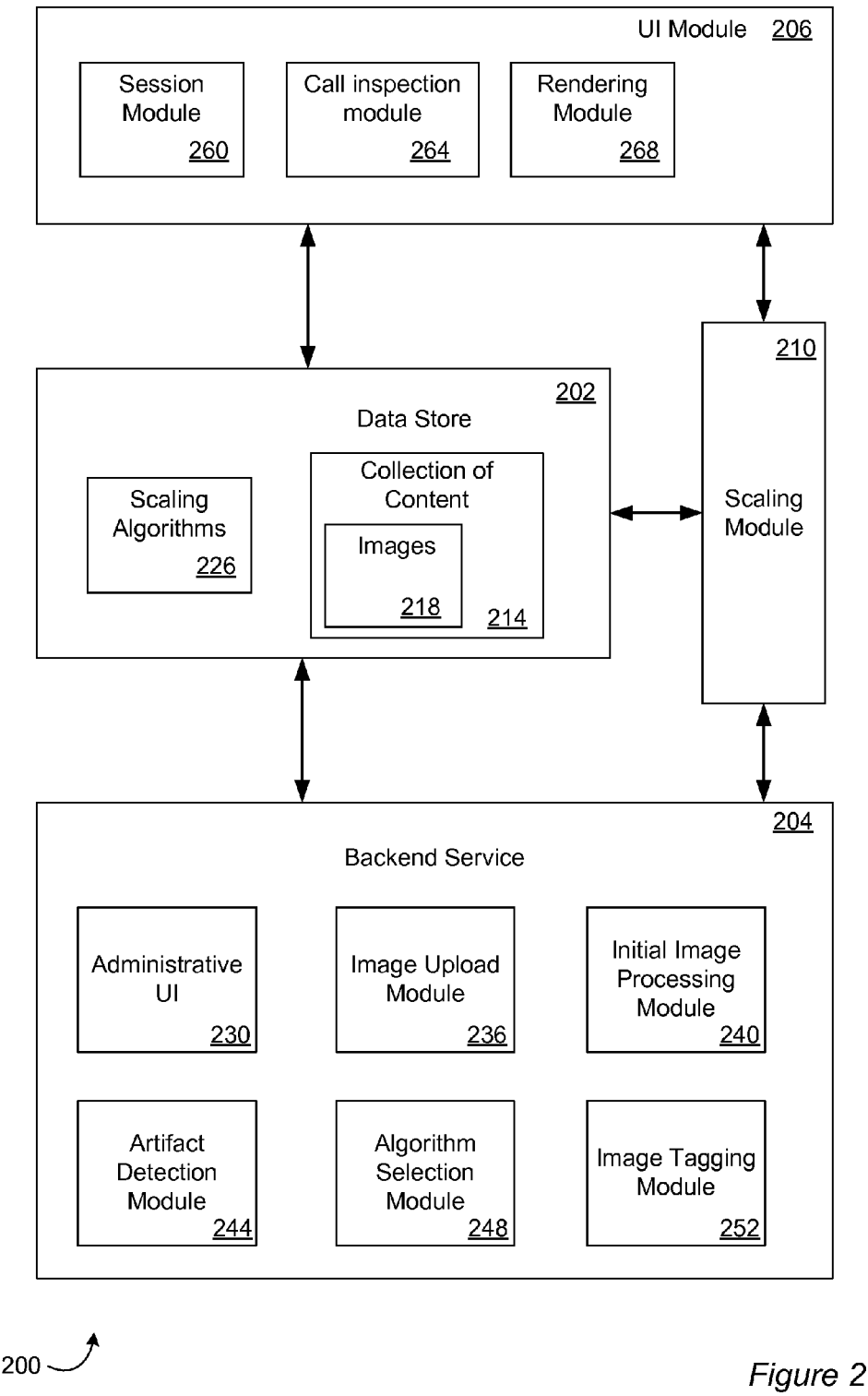
FIG. 2 is a schematic diagram depicting aspects of an example computerized system in accordance with at least one embodiment.

FIG. 2 depicts aspects of an example computerized system 200 in accordance with at least one embodiment. The system 200 may include a data store 202 that stores images and scaling algorithms, a backend service 204 that processes images to detect and tag images that exhibit artifacts when scaled using standard scaling algorithms, a user interface (UI) module 206 that facilitates user interaction with the system 200, and a scaling module 210 that applies scaling algorithms to scale images. More particularly, as illustrated in FIG. 2, the data store 202 includes, for example, a collection of content 214 that comprises individual images 218. The data store 202 may also include scaling algorithms 226, which are applied by the scaling module 210 to scale the images 218. Some of the scaling algorithms 226 may perform simple averaging, while others, for example, may use Gaussian filters and other sophisticated filters. The backend service 204 may include an administrative UI 230, an image upload module 236, an initial image processing module 240, an artifact detection module 244, a scaling algorithm selection module 248, and an image tagging module 252. The UI module 206 may include a session module 260, a call inspection module 264, and a rendering module 268. Although not illustrated, it should be appreciated that the scaling module 210 may be incorporated in the UI module 206, the backend service 204, or both.

The arrows between the modules 202, 204, 206, and 210 in FIG. 2 indicate that the modules 202, 204, 206, and 210 are communicatively coupled, for example, by a communication network in a computer and/or between a plurality of computers such as the servers 106, 108, 120 of FIG. 1. For example, the UI module 206 may be hosted and/or implemented at least in part by the application server 108, the data store 202 may incorporate and/or be incorporated at least in part by the data store 110, and the backend service 204 may be hosted and/or implemented at least in part by the build server 120.

The collection of content 214 may include any suitable content. Examples of suitable content include electronic records, data structures, data objects, representations including representations of goods such as physical goods and commercial goods and representations of services such as commercial services, documents, document collections, audio, video, and images 218, which include digital images in any suitable image format. Examples of suitable image formats include digital image formats such as raster formats including bitmaps (e.g., BMP), compressed images in accordance with a Joint Photographic Experts Group (JPEG) standard, graphics interchange formats (e.g., GIF), and portable network graphics formats (e.g., PNG), as well as vector formats such as computer graphics metafile formats (e.g., CGM) and scalable vector graphics formats (e.g., SVG).

The UI module 206, for example, may provide content, such as images 218, from the collection of content 214 for presentation. For example, the UI module 206 may generate a UI presentation specification and provide the specification to the client device 102 (FIG. 1) through the network 104. The UI module 206 may specify the UI presentation with any suitable presentation specification language including suitable hypertext markup languages (e.g., HTML) and suitable programming and/or scripting languages (e.g., JavaScript). The UI module 206 may receive information responsive to the UI presentation. For example, the UI module 206 may receive requests from the client device 102, process received requests, and activate associated UI module 206 functionality in response. Further, for example, using the client device, a user may select a link (e.g., a hyperlink specified with a uniform resource locator or URL) and cause the client device to send a hypertext transfer protocol (e.g., HTTP) request to the session module 260 of the UI module 206. The request may, for example, be a request to view one of the images 218. Upon the session module 260 receiving the request, the call inspection module 264 may inspect the request to determine whether the request includes, or is associated with a session implying, a command that specifies a scale at which the requested image 218 is to be rendered. If the request includes such a command, the call interception module 264 forwards the command to the scaling module 210, which obtains the image 218 and applies one of the scaling algorithms 226 to scale the image according to the command. After scaling the image, the scaling module 210 provides the scaled image to the UI module 206, and the rendering module 268 renders the scaled image to the client via the UI presentation specification.

Figure 3:
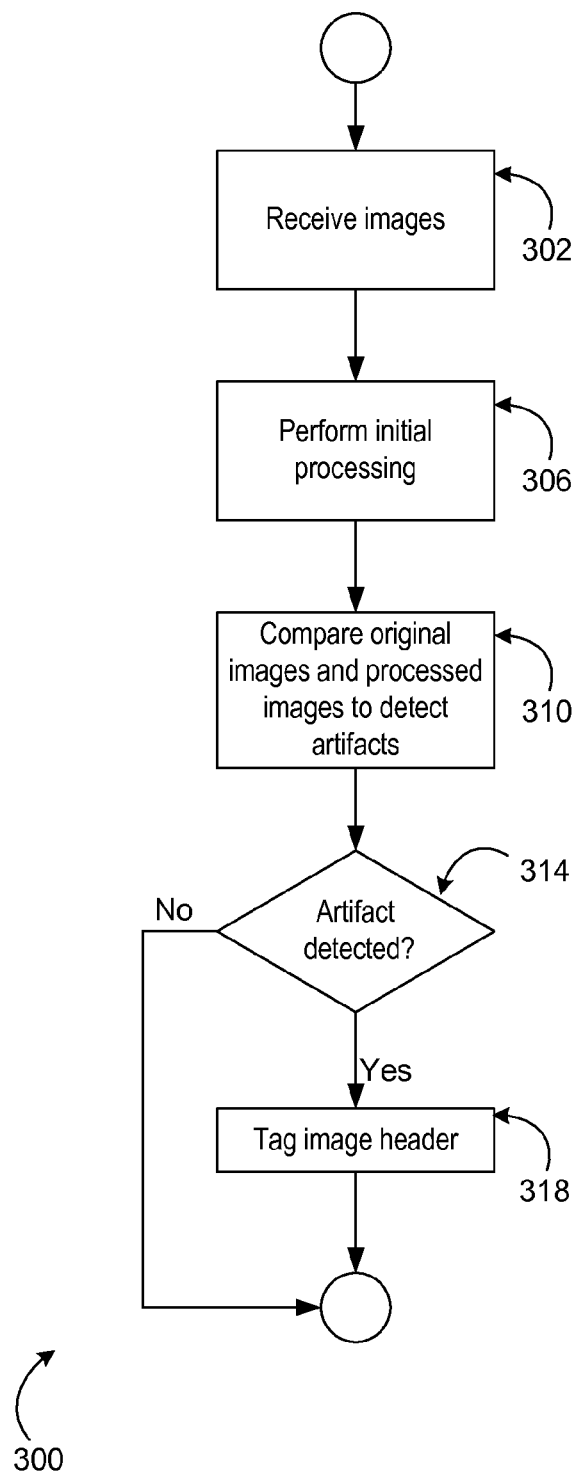
FIG. 3 is a flowchart depicting example steps for detecting images that exhibit artifacts as a result of standard processing and tagging the detected images with scaling instructions in accordance with at least one embodiment.

Turning now to FIG. 3, a flowchart is provided that depicts an example process 300 for identifying images that have artifacts and tagging those images in accordance with at least one embodiment. For example, the process 300 may be executed for preprocessing the images 218 to identify and tag images that exhibit artifacts when the scaling module 210 applies a standard algorithm from the scaling algorithms 226 to scale the images. The example process 300 is applied to images as the image are uploaded to the system 200. However, it should be appreciated that the example process 300 or a similar process could be applied to image 218 that have already been uploaded and stored in the data store 202.

As represented at block 302, the process 300 involves the system 200 receiving images. For example, the images may be received from merchants, vendors, or any suitable message-submitting individuals or entities desirous of having images, such as images of products, uploaded to the data store 202 and presented to users via the UI module 206. According to an embodiment, images are received by the system 200 via the image upload module 236. For example, the upload module 236 may be a network interface configured to receive electronic input from other devices in the network 104. As represented at block 306, the initial image processing module 240 performs initial processing on the uploaded images. Such initial image processing may involve resizing the images. To do so, for example, the initial image processing module 240 may invoke the scaling module 210 to apply a standard downscaling algorithm from the scaling algorithms 226 to resize images. For example, the initial image processing module 240 may invoke the scaling module 210 downscale large images to 500-pixels in length. In this case, the images 218 are 500-pixels in length or less.

As represented at block 310, the process 300 involves comparing the processed images to the original images to detect whether the processed images contain artifacts. Here, for example, each scaled image may be compared to its original image and, if certain differences exist between the images, then it is determined that the scaled image likely contains an artifact. According to an embodiment, the artifact detection module 244, for each image, compares the original image to the processed image to determine whether an artifact exists in the processed image. For example, the artifact detection module 244 may compare the ratio of vertical and horizontal lines of the original image to the ratio of vertical and horizontal lines of the scaled image. If the ratios differ by more than a threshold, the artifact detection module 224 determines that the processed image contains a moiré pattern, which is an artifact. Such a threshold may be, for example, a ratio of about 0.02 to 0.05. According to another embodiment, the artifact detection module 244 runs pattern detection algorithms on the original and processed images and then determines whether the processed image exhibits patterns that are not found in the original image. If the processed image exhibits different patterns, the artifact detection module 224 determines that the processed image contains a moiré pattern. According to yet another embodiment, the artifact detection module 224 runs color detection algorithms on the original and processed images and then determines whether the processed image has a different color distribution than the original image. If the processed image indeed has a different color distribution, the artifact detection module 224 determines that the processed image contains an artifact related to color distribution. It should be appreciated that instead of or in addition to comparing the each scaled image to its original image, embodiments may compare the image as scaled by a first scaling algorithm (e.g., a standard scaling algorithm) to the image as scaled by a second scaling algorithm (e.g., a special scaling algorithm, such as a moiré scaling algorithm).

As represented at decision block 314, the process 300 ends if the no artifact is detected. However, if an artifact is detected, the process 300 continues to block 318, which represents tagging the header of the image with scaling instructions. To tag one of the images 218, according to an embodiment, the image tagging module accesses the header of the image file of the image 218 and places scaling instructions in the header. For example, these scaling instructions can be read by the scaling module 210 and specify which scaling algorithm 226 the scaling module 210 is to apply when scaling the image. The particular scaling algorithm specified by the scaling instructions depends on the type of artifact detected. For example, if the detected artifact is a moiré pattern, then the scaling instructions instruct the scaling module 210 to apply one of the scaling algorithms 226 configured to minimize or prevent moiré patterns in the scaled image.

Figure 4A:
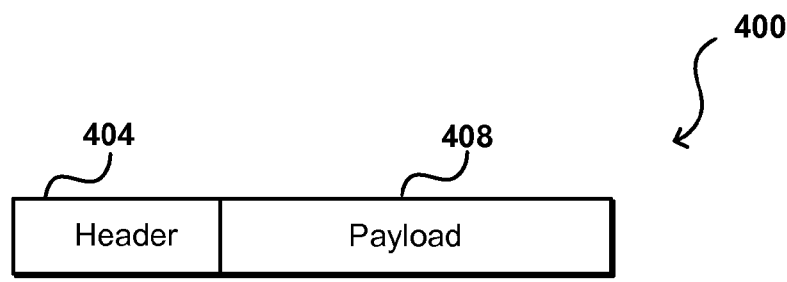
FIG. 4a illustrates an image file having scaling instructions appended thereto in accordance with at least one embodiment.

FIG. 4a illustrates an example image file 400 having scaling instructions appended thereto in accordance with at least one embodiment. The example image file 400 may be the image file of one of the images 218. In this example, the image file 400 has two main parts: a header portion 404 and a data or "payload" portion 408. The header portion 404 may be tagged with information, such as scaling instructions, and the payload portion 408 may include image data. For example, if the artifact detection module 244 were to detect the image file 400 as one that exhibits an artifact when scaled, the image tagging module 252 would place the scaling instruction in the header portion 404 of the image file 400. Then, before scaling the image file 400, the scaling module 210 would open the header portion 404 and read the scaling instruction.

Figure 4B:
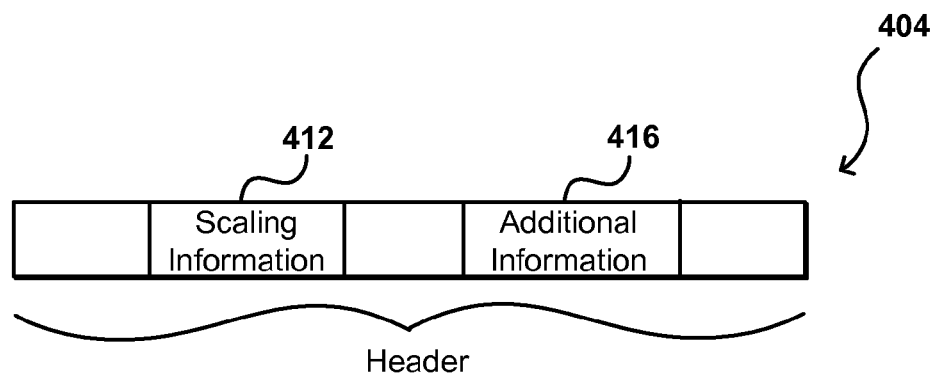
FIG. 4b illustrates a header portion of the image file shown in FIG. 4a in accordance with at least one embodiment.

FIG. 4b illustrates an embodiment of the header portion 404 of image file 400. As illustrated in FIG. 4b, the header portion 408 includes scaling information 412 and additional information 416. For example, the scaling information 412 may include the scaling instructions provided by the tagging module 252. As mentioned above, the scaling instruction may indicate or identify the scaling algorithm 226 that the scaling module 210 is to apply when scaling the associated image. The scaling information 412 may be provided in any suitable format. For example, the information can be a text-formatted data structure such as a string formatted using a JAVASCRIPT object notation (e.g., JSON) that includes characters corresponding to a particular algorithm stored in the scaling algorithms 226 of the data store 202. The scaling module 210 can contain, or have access to, a mapping of characters and corresponding algorithms in order to determine, from the characters of the scaling information 412, the appropriate algorithm to apply.

According to an embodiment, the additional information 416 may include instructions, other than scaling instructions, regarding how the image should be rendered. For example, the additional information 416 may include instructions regarding the level of quality of the image to be rendered. For example, for images that look nice at a 75 quality on a JPEG quality scale of 0-100 where 0 means total loss of image quality and 100 means no compression, the additional information 416 may include instructions for the rendering module 268 to render the image at 75 quality. On the other hand, for images that need to be loaded at a quality of 90 or above to look nice, the additional information 416 may include instructions to render the images at 90 quality. Also, for example, the additional information 416 may include instructions that indicate whether human faces are detected in the image. In this case, the rendering module 268 reads the additional information 416 that indicates human faces are depicted in the image and, in response, renders the image at a higher than normal quality. Although FIG. 4b illustrates scaling information 412 and additional information 416 separately, it should be appreciated that this information may be combined. Further, it should be appreciated that additional information 416 may contain information other than the information discussed herein.

Figure 5:
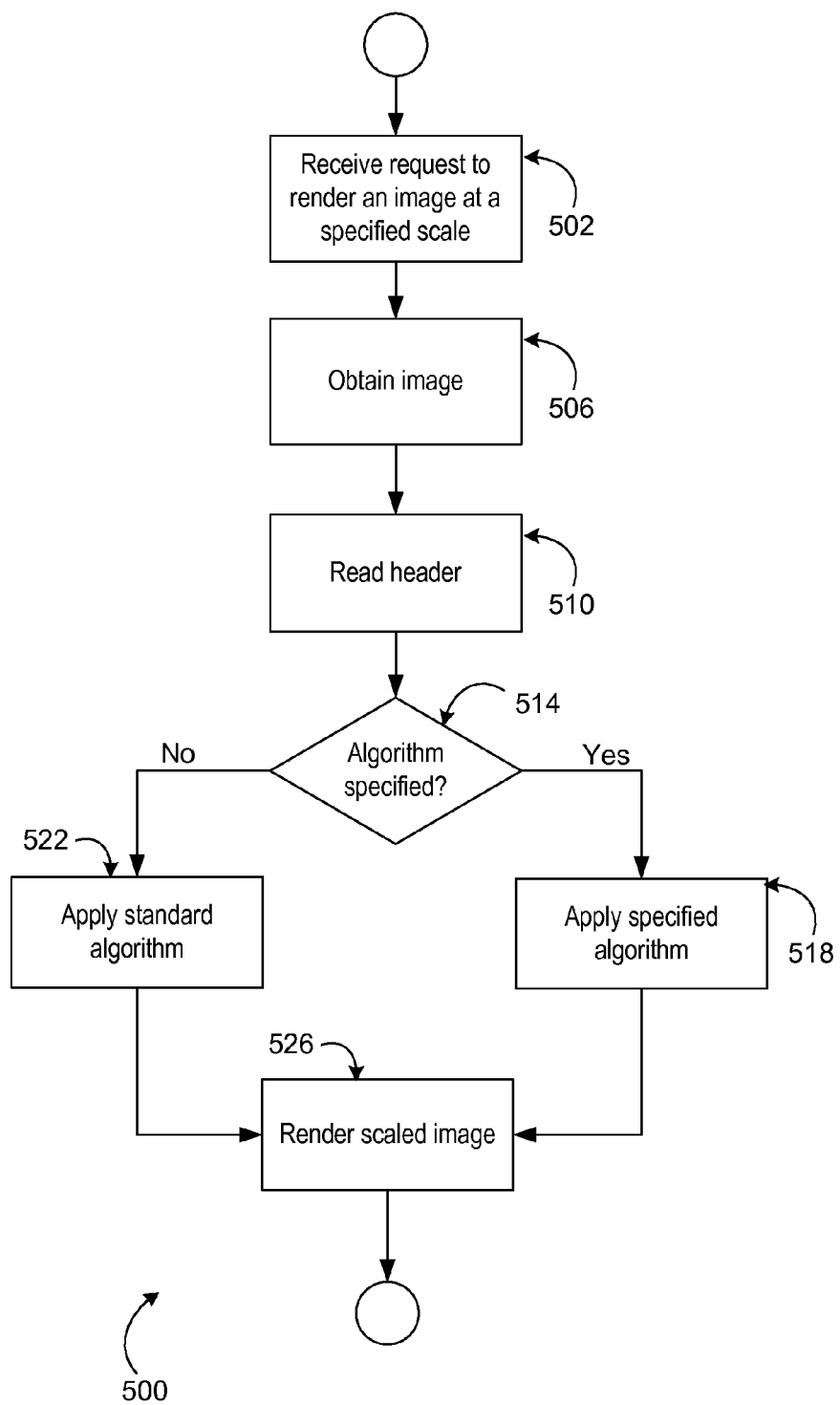
FIG. 5 is a flowchart depicting example steps for rendering images in response to client requests in accordance with at least one embodiment.

With reference to FIG. 5, a flowchart is provided that depicts an example process 500 for rendering images in response to client requests in accordance with at least one embodiment. As represented at block 502 the process 500 involves receiving a request to render an image at a specified scale. For example, the UI module 206 may receive a request to render an image at a particular scale from the client device 102. As mentioned above, a user may visit a web page using the client device 102 and select a URL. This causes the client device to send a GET request to the session module 260 of the UI module 206. In this example, the GET request is a request to view one of the images 218. Upon the session module 260 receiving the GET request, the call inspection module 264 inspects the request to identify a command that specifies the scale at which the requested image 218 is to be rendered. The call interception module 264 then forwards the command to the scaling module 210.

As indicated at steps 506 and 510, the image is obtained and the header of the image is read. For example, the scaling module 210, after receiving the command from the call interception module 264, obtains the image from the images 218 and reads the header of the image. For example, the scaling module 210 reads the scaling information 412 that the tagging module 252 placed in the header 404 of the image 400. As represented at decision block 514, if the header includes scaling instructions that specify an algorithm, then, as represented at block 518 the specified algorithm is applied to scale the image. For example, the scaling module 210 accesses the scaling algorithms 226 of the data store 202, obtains the algorithm specified by the scaling instructions in the header, and applies the specified algorithm to scale the image. However, if the header does not include scaling instructions, then, as represented at block 522, a standard algorithm is applied to scale the image to the size specified in the command associated with the user-selected URL. For example, the scaling module 210 accesses the scaling algorithms 226, obtains a standard algorithm, and applies the standard algorithm to scale the image to the size specified in the command associated with the user-selected URL.

As represented at block 526, after the image is scaled, the image is provided for presentation. For example, after scaling the image, the scaling module 210 provides the scaled image to the UI module 206, and the rendering module 268 renders the scaled image to the client via the UI presentation specification.

Figure 6:
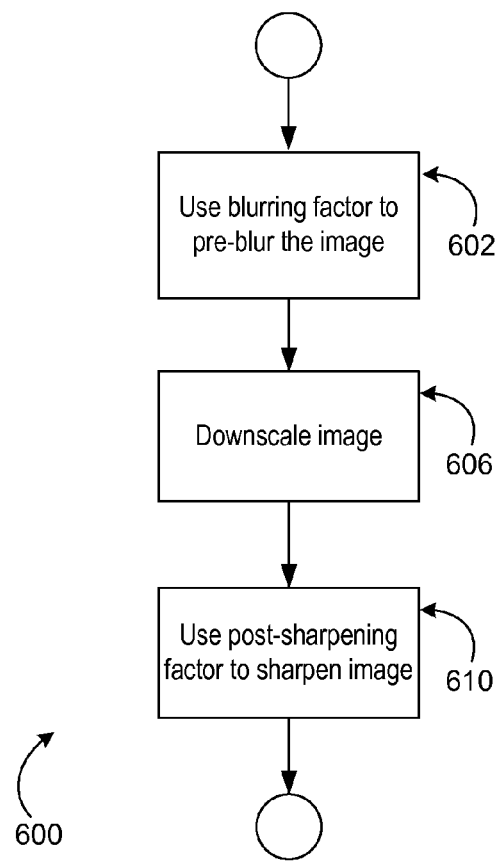
FIG. 6 is a flowchart depicting example steps for scaling images in accordance with at least one embodiment.

Referring now to FIG. 6, a flowchart is provided that depicts an example process 600 for scaling images in accordance with at least one embodiment. Process 600 may be applied to scale images in a manner that eliminates or prevents moiré patterns in images that otherwise exhibit moiré patterns when scaled using standard scaling algorithms. According to an embodiment, the process 600 is one of the algorithms stored in the scaling algorithms 226 (FIG. 2) that may be applied to scale images that were tagged as images that exhibit moiré patterns when scaled using standard scaling algorithms.

As represented at block 602, a blurring factor is used to pre-blur the image being scaled according to the process 600. Pre-blurring involves removing details from the image. This is desirable since the removed details do not destroy the basic structure of the image. Instead, removing the details just reduces the sharpness of the image. As represented at block 606, the image is downscaled to the specified size using standard scaling downscaling techniques. After the image has been downscaled, a sharpening factor is used to sharpen the scaled image by adding back into the image the details that were removed when pre-blurring the image, as represented at block 610.

According to an embodiment, a regression function is used to determine the blurring and sharpening factors. For example, the regression function is determined by obtaining a set of training images known to exhibit Moiré patterns and then fitting the curve of the regression function to prevent the Moiré pattern in those images. It should be noted that different regression functions are used for determining blurring and sharpening factors. Further, it should be noted that the regression function is affected by the initial sizes of the image. Accordingly, the blurring factors and sharpening factor should be selected based on whether the blurring factors and sharpening factors were calculated using a regression function that was determined based on a set of training images that are the same or similar size of the image in question.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    under the control of one or more computer systems configured with executable instructions,
    processing a plurality of image files to identify ones of the plurality of image files that exhibit an artifact when scaled by a first scaling algorithm;
    adding a tag to a header portion of the identified ones of the plurality of image files that exhibit the artifact when the image file is scaled by the first scaling algorithm; and
    responsive to a request to render one of the plurality of image files at a specified size,
    reading the header portion of the requested one of the plurality of image files;
    if the header portion of the requested one of the plurality of image files does not include the tag, applying the first scaling algorithm to scale the requested one of the plurality of image files to the specified size;
    if the header portion of the requested one of the plurality of image files includes the tag, applying a second scaling algorithm to scale the requested one of the plurality of image files to the specified size; and
    providing the requested one of the plurality of image files for presentation at the specified size.

2. The computer-implemented method of claim 1, wherein the artifact is a moiré pattern.

3. The computer-implemented method of claim 1, wherein the requested one of the plurality of image files is downscaled to the specified size.

4. The computer-implemented method of claim 3, wherein the first scaling algorithm is a standard scaling algorithm.

5. The computer-implemented method of claim 3, wherein the second scaling algorithm is a moiré scaling algorithm.

6. The computer-implemented method of claim 5, wherein the moiré scaling algorithm is configured to, at least:
    use a blurring factor to remove detail from the requested one of the plurality of image files;
    apply a standard downscaling algorithm to downscale the requested one of the plurality of image files; and
    using a sharpening factor to add the detail back into the requested one of the plurality of image files.

7. A computer-implemented method, comprising:
    under the control of one or more computer systems configured with executable instructions, processing a plurality of image files to identify ones of the plurality of image files that exhibit an artifact when transformed by a first transformation algorithm; and adding a transformative instruction to a header portion of the identified ones of the plurality of image files that exhibit the artifact when transformed by the first transformation algorithm, wherein the transformative instruction specifies using a second transformation algorithm.

8. The computer-implemented method of claim 7, wherein the transformative instruction is a scaling instruction and the first and second transformation algorithms are first and second scaling algorithms.

9. The computer-implemented method of claim 8, wherein processing the plurality of image files to identify ones of the plurality of image files that exhibit the artifact, comprises:

for each of the plurality of image files,
scaling the image file using the first algorithm;
scaling the image file using the second algorithm; and
comparing the image file as scaled by the first algorithm and the image file as scaled by the second algorithm.

10. The computer-implemented method of claim 9, wherein comparing the image file as scaled by the first algorithm and the image file as scaled by the second algorithm, comprises:

applying a pattern detection algorithm to the image file as scaled by the first algorithm and to the image file as scaled by the second algorithm to determine whether the files exhibit different patterns; and identifying the image file as an image file that exhibits an artifact if the files exhibit different patterns.

11. The computer-implemented method of claim 9, wherein comparing the image file as scaled by the first algorithm and the image file as scaled by the second algorithm, comprises:

determining a first ratio of vertical and horizontal lines of the image file as scaled by the first algorithm;

determining a second ratio of vertical and horizontal lines of the image file as scaled by the second algorithm; and identifying the image file as an image file that exhibits an artifact if the first and second ratios differ by more than a threshold.

12. The computer-implemented method of claim 9, wherein comparing the image file as scaled by the first algorithm and the image file as scaled by the second algorithm, comprises:

applying a color detection algorithm to the image file as scaled by the first algorithm to determine a first color distribution pattern;

applying the color detection algorithm to the image file as scaled by the second algorithm to determine a second color distribution pattern; and identifying the image file as an image file that exhibits an artifact if the first and second color distribution patterns differ.

13. The computer-implemented method of claim 8, wherein processing the plurality of image files to identify ones of the plurality of image files that exhibit an artifact, comprises:

for each of the plurality of image files,
scaling the image file using the first algorithm; and
comparing the image file before scaling to the image file as scaled by the first algorithm.

14. The computer-implemented method of claim 13, wherein comparing the image file before scaling to the image file as scaled by the first algorithm, comprises:

applying a pattern detection algorithm to the image file as scaled by the first algorithm and to the image file before scaling; and identifying the image file as an image file that exhibits an artifact if the files exhibit different patterns.

15. The computer-implemented method of claim 13, comparing the image file before scaling to the image file as scaled by the first algorithm, comprises:

determining a first ratio of vertical and horizontal lines of the image file as scaled by the first algorithm;

determining a second ratio of vertical and horizontal lines of the image file before scaling; and identifying the image file as an image file that exhibits an artifact if the first and second ratios differ by more than a threshold.

16. The computer-implemented method of claim 13, comparing the image file before scaling to the image file as scaled by the first algorithm, comprises:

applying a color detection algorithm to the image file as scaled by the first algorithm to determine a first color distribution pattern;

applying the color detection algorithm to the image file before scaling to determine a second color distribution pattern; and identifying the image file as an image file that exhibits an artifact if the first and second color distribution patterns differ.

17. A computer-implemented method, comprising:

under the control of one or more computer systems configured with executable instructions, receiving a request from a client to render an image file at a specified size;

determining whether a header portion of the image file includes a scaling instruction that specifies a scaling algorithm to apply when scaling the image file;

if the header portion of the image file includes the scaling instruction, applying the specified scaling algorithm to scale the image file to the specified size;

if the header portion of the image file does not include the scaling instruction, applying a first scaling algorithm to scale the image file to the specified size; and providing the image file for presentation at the specified size.

18. The computer-implemented method of claim 17, further comprising:

removing the scaling instruction from the header portion before rendering the image file.

19. The computer-implemented method of claim 17, wherein the specified scaling algorithm is a moiré scaling algorithm.

20. The computer-implemented method of claim 17, wherein the first scaling algorithm is a standard scaling algorithm.

21. A computer program product embedded in a non-transitory computer-readable medium, comprising:

program code for processing a plurality of image files to identify ones of the plurality of image files that exhibit an artifact when scaled by a first scaling algorithm;

program code for adding a tag to a header portion of the identified ones of the plurality of image files that exhibit the artifact when the image file is scaled; and responsive to a request to render one of the plurality of image files at a specified size, program code for reading the header portion of the requested one of the plurality of image files;

program code for applying the first scaling algorithm to scale the requested one of the plurality of image files to the specified size if the header portion of the requested one of the plurality of image files does not include the tag;

program code for applying a second scaling algorithm to scale the requested one of the plurality of image files to the specified size if the header portion of the requested one of the plurality of image files includes the tag; and program code for rendering the requested one of the plurality of image files at the specified size.

22. The computer program product of claim 21, wherein the artifact is a moiré pattern.

23. The computer program product of claim 21, wherein the requested one of the plurality of image files is downscaled to the specified size.

24. A system, comprising:

a processor; and a memory device including instructions that, when executed by the processor, cause the processor to, at least:

process a plurality of image files to identify ones of the plurality of image files that exhibit an artifact when scaled by a first scaling algorithm;

add a tag to a header portion of the identified ones of the plurality of image files that exhibit the artifact when the image file is scaled; and responsive to a request to render one of the plurality of image files at a specified size, read the header portion of the requested one of the plurality of image files;

apply the first scaling algorithm to scale the requested one of the plurality of image files to the specified size if the header portion of the requested one of the plurality of image files does not include the tag;

apply a second scaling algorithm to scale the requested one of the plurality of image files to the specified size if the header portion of the requested one of the plurality of image files includes the tag; and render the requested one of the plurality of image files at the specified size.

25. The system of claim 24, wherein the artifact is a moiré pattern.

26. The system of claim 24, wherein the requested one of the plurality of image files is downscaled to the specified size.

* * * * *